Patented Aug. 13, 1935

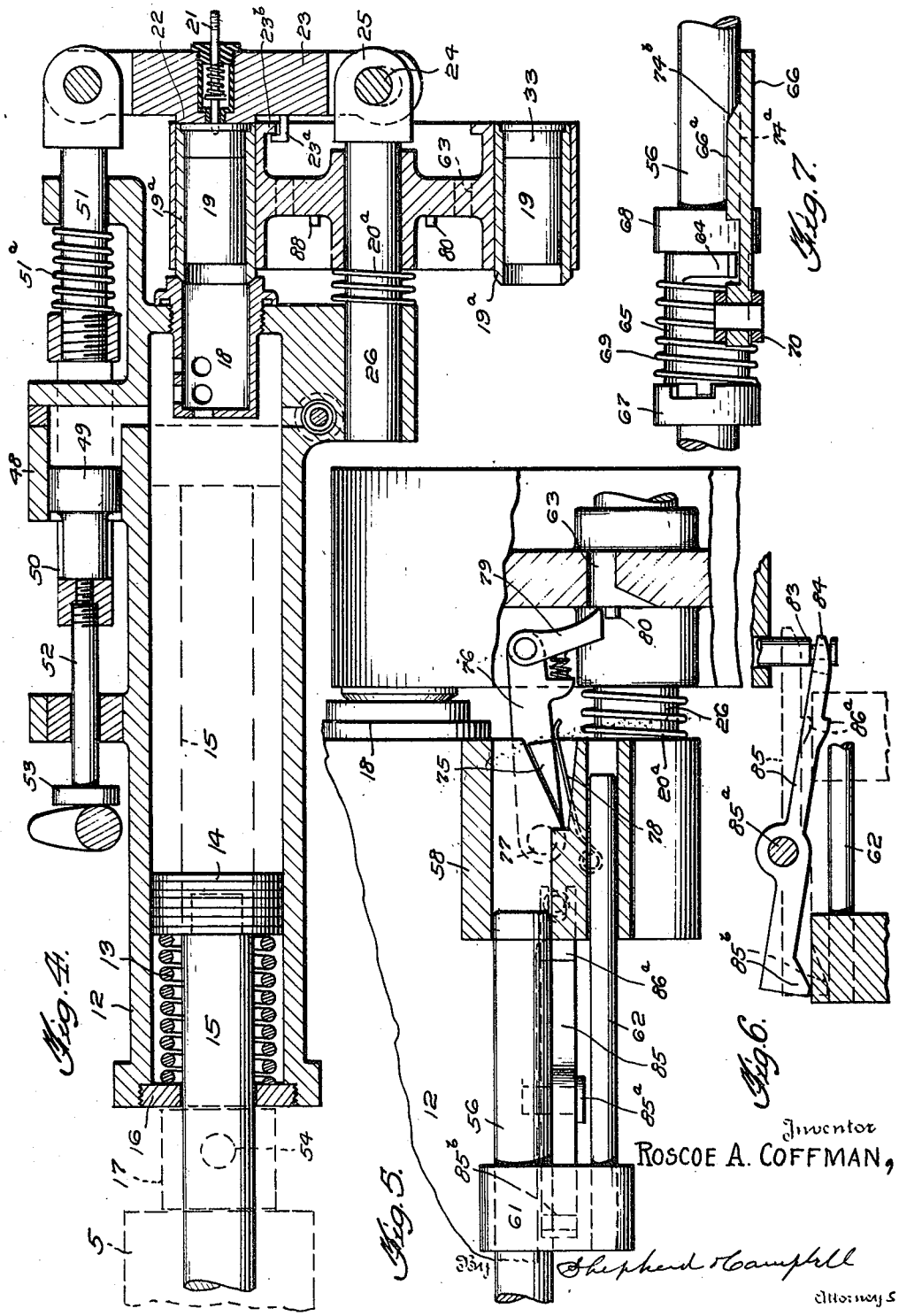

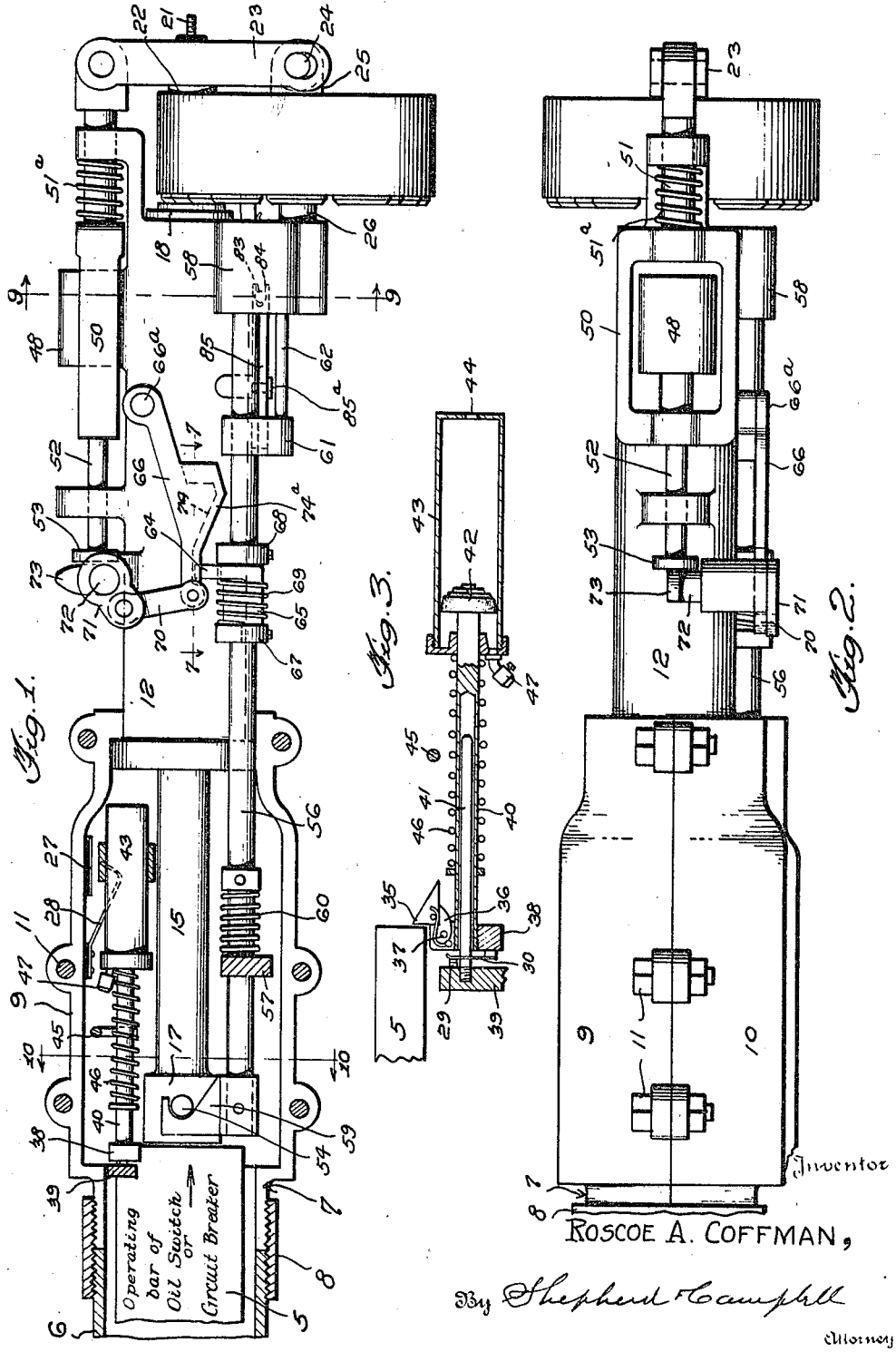

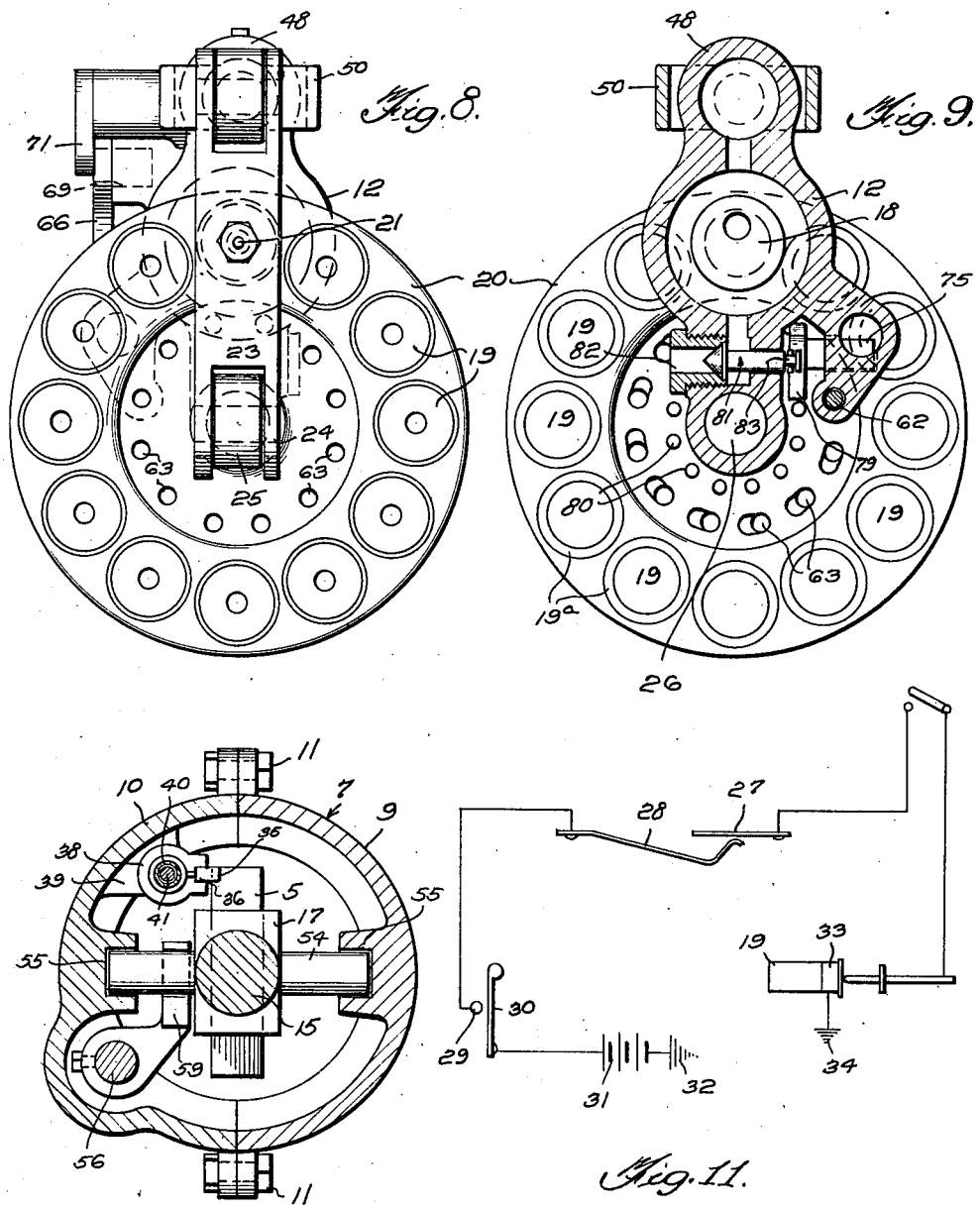

2,011,144

UNITED STATES PATENT OFFICE 2,011,144

METHOD OF AND MEANS FOR OPERATING ELECTRIC CIRCUIT MAKING AND BREAKING DEVICES

Roscoe A. Coffman, Pittsburgh, Pa.

Application February 26, 1932, Serial No. 595,403
Renewed April 15, 1935

19 Claims. (Cl. 200—82)

This invention relates to a method of and means for automatically controlling and resetting oil switches, circuit breakers, and the like, and various electrically operated devices from distant points, if desired.

The voltages carried upon modern power transmission lines are so high that the disconnector switches, oil switches, and the like, including the oil switches used in conjunction with automatic circuit breakers, lightning arresters, and the like, must be made of considerable size and weight. Some of the best known switches of this character comprise a longitudinally slidable bar, and where the switches are used in conjunction with automatic circuit breakers, the arrangement is such that this bar flies outwardly in its circuit breaking movement and is automatically returned to closing position a plurality of times, usually three. If it flies out for the fourth time, it is not again automatically returned, but must be manually reset; the assumption being that if the switch does not remain closed after three attempts some permanent trouble exists which should be removed before the switch is again closed.

The mechanism for the automatic control of these circuit making and breaking devices, as at present constructed, comprise very complicated and expensive electrical devices of a nature to require the running of comparatively heavy current supply wires to them.

Broadly stated, the object of the present invention is to utilize the power from one or more unit charge devices in the nature of a cartridge, very similar in size and shape to an ordinary shotgun shell, to actuate a switch controlling mechanism from a distant point and as frequently as may be desired. The construction is such that if the switch actuating bar flies out to switch disconnecting position, my improved mechanism will return it to switch closing position three times, and will, if it again flies out, permit it to remain out until the trouble has been cleared from the line whereupon my same mechanism will operate to restore the switch operating member to switch closing movement of the same, as above outlined.

Additional objects and advantages of the invention will be more readily understood from a consideration of the accompanying drawings wherein:

Figure 1 is a side elevation of a mechanism constructed in accordance with the present invention.

Figure 2 is a plan view thereof.

Figure 3 is a detailed sectional view of a dashpot and associated parts hereinafter described.

Figure 4 is a partial longitudinal section through the power cylinder and magazine hereinafter described.

Figure 5 is a fragmentary sectional view illustrating the magazine operating pawl.

Figure 6 is a detailed plan view of the actuating member of the exhaust valve.

Figure 7 is a horizontal sectional view on line 7—7 of Fig. 1.

Figure 8 is a rear elevation of the device.

Figure 9 is a vertical sectional view on line 9—9 of Fig. 1.

Figure 10 is a transverse sectional view on line 10—10 of Fig. 1 and

Figure 11 is a diagrammatic view illustrating the electric circuit hereinafter described.

The operating bar of an oil switch, or other circuit maker and breaker or apparatus to be controlled is indicated at 5, in Fig. 1, and in the known constructions the bars of this nature are longitudinally movable in a pipe or tube 6. I mount the device of my invention directly upon the end of the pipe 6 by merely removing a cap (not shown) and screwing the end of my casing 7 into the coupling 8 of said pipe 6. The casing comprises the two halves 9 and 10 which are held together by the bolts 11, and at its outer end this two-part casing is clamped by the bolts 11 upon a cylinder 12. A retainer spring 13 in the cylinder resists outward movement of a piston 14 that is mounted upon a piston rod 15 movable through a guide and closure plate 16 and carrying upon its outer end a block 17 which lies in the path of movement of the operating bar 5.

Consequently, when the bar 5 flies outwardly in the direction of the arrow to circuit breaking position, it moves into engagement with head 17 which is held in retracted position by spring 13. A combustion chamber 18 is threaded into the rear end of the cylinder and is adapted to receive the burnable charge from a shell 19 that is mounted in a rotative magazine block 20. The shell may be of the nature of that shown in my copending application Serial No. 586,057. The shell, as described, is adapted to be electrically ignited when current is supplied to a central firing pin, corresponding to the central firing pin 21 of Fig. 4 of the present case. The described charge of said shell consists of highly volatile nitrocellulose grains of a nature to burn with great rapidity and to deliver a considerable volume of heated pressure gas but not being sufficiently explosive to constitute a detonator together with a suitable quick flash igniter.

When the charge burns in the combustion chamber 18 pressure is delivered upon piston 14 to thrust the bar 5 to the left or back to circuit making position and during the burning of the charge, the shell is backed up and supported by a breech block 22 through which pin 21 projects and which is carried by a swinging arm 23 having a loose pivotal mounting, at 24, upon the head 25 of a fixed stub shaft 26. Referring now to Fig. 11, it will be seen that the circuit to the firing pin 21 includes two distinct circuit making devices, one of these comprising the plate 27 and spring arm 28, and the other comprising a contact point 29, and a spring arm 30. The spring arm 30 is connected to a battery or other suitable source of power, indicated at 31, and the latter is grounded, at 32. In like manner, the ferrule 33 of the shell may be grounded by reason of its contact with the magazine, as indicated at 34. Therefore, it will be seen that the circuit must be closed between 27 and 28 and also between 29 and 30, before the shell will be fired.

The circuit between 27 and 28 is completed, whenever the bar 5 moves outwardly a predetermined degree, by the upper edge of said bar riding beneath and contacting with the spring arm 28 for thrusting it upwardly into contact with the plate 27. However, this same outward movement of the bar 5, see Fig. 3, broke the contact between 29 and 30 at the beginning of movement of said bar 5 by the engagement of said bar with the nose 35 of a latch 36 that is pivoted, at 37, upon a block 38. The contact 29 is carried by a lug 39 of the casing, but the contact arm 30 is carried by the block 38. The block 38 is carried by a sleeve 40 that is mounted to slide upon a guide pin 41. This sleeve 40 carries a dashpot piston 42 that is mounted to travel in a dashpot cylinder 43 having an air inlet opening 44 at its end.

Therefore, when the bar 5, through latch 36, thrusts the block 38, sleeve 40, and piston 42 to the right, in Figs. 1 and 3, the circuit will be broken and will remain broken until contact is again established between 29 and 30. This occurs when, as the latch 36 travels rearwardly it engages with a pin 45 and is depressed so that it no longer engages bar 5, and said bar passes on leaving the latch and block 38 to be returned toward the left by a spring 46. The rate of speed at which this return movement can be effected will be determined by the setting of the valve 47 which controls the escape of air from the corresponding end of the dashpot cylinder 43 and thus the length of time which is to elapse between the time that the bar 5 flies out and the time at which it is desired to have this apparatus returned may be very accurately gaged.

It is clear that when the return of the dashpot and block 38 is effected, and contact is completed between 29 and 30, a cartridge will be fired and the bar 5 will be again thrust to the left (Fig. 1). This operation could be repeated until all the cartridges in the magazine were used in succession. However, as a practical matter, I contemplate omitting every fourth cartridge although I may omit every third or every sixth cartridge instead. In fact, there is no restriction whatever with respect to the disposition of the cartridges.

During the time that the cartridge is being fired, the breech block bar 23 is pressed forcibly against the head of the shell by pressure of the expanding gases which enter a small cylinder 48 and press upon a piston 49 that is connected by a yoke 50 and link 51 with the upper end of the bar 23. The yoke 50 also carries a stem 52 having a head 53 through which opening movement may be imparted to the breech block when the time comes to impart a step forward to the magazine for the purpose of bringing a new shell into firing position.

The head 17, Figs. 1 and 10, carries a transverse pin 54 that is mounted to travel in guideways 55 formed in the sides of the two-part casing. A rod 56 is mounted for longitudinal movement in an ear 57 of the two-part casing 9—10 and in a bearing block 58 projecting from the cylinder. When the pin 54 on head 17 moves forwardly it engages a hook like block 59 upon the end of the rod 56 and pulls said rod toward the left in Fig. 1 against the tension of the spring 60. This takes place near the completion of the power stroke of the piston 14 and at the conclusion of this movement of the rod 56 it will (through a block 61 carried by said rod 56) have withdrawn a pin 62, see Fig. 5, from one of the locking recesses 63 of the magazine, thereby leaving said magazine free to have partial rotation imparted to it upon the return movement of the bar 56 to the right. Therefore, upon return movement of piston 14 to the right under thrust of spring 13 hook 59 is released and spring 60 acts to move bar 56 to the right and in so doing opens the breech block, advances the magazine one step, locks the magazine in its new position and finally at the end of its stroke closes the exhaust valve in readiness for another explosion. These several functions are effected as follows:

When the bar 56 begins its movement to the right, the cam nose 64 of the oscillating sleeve 65 thrusts a cam bar 66 upwardly. The sleeve 65 is mounted between two collars 67 and 68 on bar 56 and its nose 64 is moved toward the cam bar 66 by a spring 69, one end of which is engaged with the collar 67 and the other end of which is engaged with the nose 64.

The cam bar is illustrated in side elevation, in Fig. 1, and in horizontal section in Fig. 7. It is pivoted at one end, as indicated at 66a, and its free end is connected by a link 70 with a crank 71 upon the end of a shaft 72 which carries a cam 73 adapted to act against the head 53 of stem 52. As the bar 56 moves rearwardly, the nose 64 acts against an inclined surface 74 to elevate arm 66 and consequently to rock cam 73 to cause said cam to act against head 53. This results in releasing the bar 23 and a hook 23a of said bar, which acts to engage a flange 23b of the magazine to move the breech block rearwardly enough to free its lining section 19a from its seating upon the combustion chamber 18. This rearward movement of the magazine is assisted by a spring 20a on stub shaft 26.

A spring 51a acts upon the yoke 50 in a direction tending to seat the breech block. During the rearward movement of nose 64 said nose has been held into engagement with the depending ledge 74a of the cam arm. At the completion of the rearward movement of the bar 56, arm 66 drops, after which, reverse movement of the nose 64 to the left will cause said nose to first ride up the inclined surface 74b and thence along the flat rear face 66a of arm 66 until it again reaches a position rearwardly of the inclined face 74 preparatory to repeating the operation. When near the end of its stroke rearwardly, the rear end of the bar 56, see Fig. 5, engages a cam lug 75 upon a lever 76 that is pivoted, at 77, to thereby depress said lever against the tension of the spring 78 and cause a spring actuated pawl 79 that is mounted on the outer end of the said lever to engage one of the pins 80 of the magazine 20 and impart one-twelfth of a revolution to said magazine. Additional movement rearwardly of the bar 56 will bring the rear end of the pin 62 into engagement with one of the openings 63 to lock the magazine.

An exhaust valve 81, Fig. 9, controls the escape of the spent gases from the cylinder through a nipple 82. This valve has a reduced portion 83 upon its stem which is straddled by the forked end 84 of a lever 85 that is pivoted intermediate its ends, at 85a.

When the bar 56 nearly reaches its limit of movement toward the left, it engages the cam end 85b of said lever 85 to open the exhaust valve and when it reaches its limit of movement toward the right, it rides in front of a projection 86a to hold the exhaust valve closed during the firing operation.

From the foregoing description, it will be seen that a very efficient means is here provided for automatically operating mechanisms of the character described a plurality of times with any desired interval between such operations and through the medium of the economical and highly efficient, self-contained power units comprised by shells of the character described. By virtue of this I am able to eliminate an enormous quantity of highly technical and very expensive mechanism as well as the necessity of wiring the installations for the heavy current commonly employed in the handling of such devices. Devices comprising heavy oil switches, automatic circuit breakers, lightning arresters, and the like are usually employed in the handling of very high voltage alternating current. The solenoids, magnets, and like instrumentalities employed in the automatic control and return in the closing of such circuits are usually operated by much lower voltage direct current. Thus, either very expensive converting and transforming mechanism must be employed or else low voltage power wires, or very expensive storage batteries must be provided to supply the low voltage direct current.

In remote and isolated installations, it is frequently the case that large banks of very expensive storage batteries are to be found for supplying this low voltage current. Since the shells of the present application may be fired with a very small amount of current, the running of a line, as light as ordinary bell wire, would be sufficient to provide the necessary current. While I have described the device as being automatically operable, it is clear that the mere inclusion of a switch, such as that indicated at X in the circuit, would provide means for manual control from a distant point.

A shell such as I have herein shown and described may be fired with an ordinary flash light battery. Its current demands are so very low that control mechanism of the utmost simplicity and economy may be employed.

Having described my invention, what I claim is:

1. The combination with a switch controlling element, of a plurality of cartridges each containing a charge which when burned delivers a volume of propulsive gases, means for automatically discharging a plurality of said cartridges in succession and for delivering the forces released thereby upon said controlling element, and means for creating determined periods of delay between the firing of the several cartridges.

2. A device of the character described comprising a cylinder, a piston operable therein, a switch element, means whereby movement of the piston is transmitted to said element, a unit charge shell, means for firing said shell, means for delivering the pressure from said shell into said cylinder, means for firing said shell including an electric circuit, and circuit closing means in said circuit operable under the influence of the movement of the switch controlling element.

3. The combination with the longitudinally movable operating bar of a switch mechanism, of a cylinder, a piston therein, means for transmitting movement of said piston to said bar, a rotative magazine, a plurality of unit charge shells carried by said magazine, means for imparting a step by step movement to said magazine to successively bring said shells into communication with said cylinder, means for firing said shells including an electric circuit, a plurality of circuit controlling means in said circuit operable under the influence of the operating bar, and means for holding one of said circuit closing means in open position for a timed period after the operating bar moves to open position.

4. A structure as recited in claim 3 wherein the last named means comprise a dashpot and a part actuated by said dashpot, said part carrying one of the circuit closing means.

5. A structure as recited in claim 3 in combination with a breech block, a movable element by which said breech block is carried, and a pressure actuated means in communication with the cylinder for moving the breech block toward the rear of the magazine.

6. A device of the character described comprising a cylinder, a piston therein, a switch operating member actuated by said piston, a magazine rotatively mounted at the rear of the cylinder and having a plurality of shell receiving openings adapted to be brought successively into communication with the cylinder, a breech block carrying element, a lock for locking the magazine against rotation, feed mechanism for the magazine imparting step by step rotation to said magazine, a piston in the cylinder, and means for operating the breech block, magazine, feed mechanism, and magazine locking mechanism under the influence of the pressure transmitted to said cylinder from shells of the magazine.

7. The combination with the longitudinally movable operating bar of a conventional switch mechanism, of a support, means for maintaining said support in juxtaposition to said bar, a cartridge actuated part adapted to thrust said bar to closed position, and means for imparting successive operations to said part comprising a magazine, a plurality of unit charge cartridges therein, and an electric firing circuit for said cartridges, said circuit comprising two circuit completing elements, one of which is closed by the movement of said bar to open position and the other of which is opened upon initial movement of said bar and then released, and means independent of said bar for returning the last named element to circuit closing position.

8. The combination with the longitudinally movable operating bar of a conventional switch mechanism, of a support, means for maintaining said support in juxtaposition to said bar, a cartridge actuated part adapted to thrust said bar to closed position, and means for imparting successive operations to said part comprising a magazine, a plurality of unit charge cartridges therein, an electric firing circuit for said cartridges, said circuit comprising two circuit completing elements, one of which is closed by the movement of said bar to open position and the other of which is opened upon initial movement of said bar and then released, means independent of said bar for returning the last named element to circuit closing position, and means for delaying the return movement of said last named element.

9. The combination with the longitudinally movable operating bar of a conventional switch mechanism, of a support, means for maintaining said support in juxtaposition to said bar, a cartridge actuated part adapted to thrust said bar to closed position, means for imparting successive operations to said part comprising a magazine, a plurality of unit charge cartridges therein, an electric firing circuit for said cartridge, said circuit comprising two circuit completing elements, one of which is closed by the movement of said bar to open position and the other of which is opened upon initial movement of said bar and then released, means independent of said bar for returning the last named element to circuit closing position, and means for delaying the return movement of said last named element, said delaying means comprising a dashpot, the plunger of which is moved in one direction by said bar.

10. A device of the character described comprising a cylinder, a piston therein, a rod connected to said piston, a head carried by said rod, a longitudinally movable bar, a spring for moving said bar in one direction, connections between said bar and head for moving the bar against the tension of said spring, a magazine, a plurality of cartridges therein each containing a unit non-explosive but propulsive charge, a breech block, a locking means for the magazine, and a feeding mechanism for the magazine, said feeding mechanism, breech block, and locking means being all actuated by the movement of said bar.

11. A device of the character described comprising a cylinder, a piston therein, a rod connected to said piston, a head carried by said rod, a longitudinally movable bar, a spring for moving said bar in one direction, connections between said bar and head for moving the bar against the tension of said spring, a magazine, a plurality of cartridges therein each containing a unit non-explosive but propulsive charge, a breech block, a locking means for the magazine, a feeding mechanism for the magazine, said feeding mechanism, breech block, and locking means being all actuated by the movement of said bar, an exhaust valve, and means actuated by said bar for controlling said exhaust valve.

12. A device of the character described comprising an electrically fired cartridge, a member to be actuated, an electric circuit, and a pair of circuit controlling means in said circuit one of which is closed by the movement of the part to be actuated and the other of which is closed by a delay device set in operation by the movement of the part to be actuated.

13. A device of the character described comprising a cylinder, a combustion chamber projecting thereinto, a unit charge cartridge, means for bringing said cartridge into tight engagement with the combustion chamber, means for firing the cartridge and discharging its contents into the combustion chamber, and means for conducting the products of combustion into said cylinder.

14. The combination with a cylinder and piston therein, of a magazine containing a plurality of unit charge cartridges, means for bringing said cartridges successively in communication with said cylinder, a breech block, a firing pin carried thereby, a pressure actuated element, means for conducting pressure from the cylinder to said element, connections between said element and the breech block, a bar actuated in one direction by the movement of the piston and spring actuated in the opposite direction, a locking member for the magazine that is locked by movement of the bar under the influence of its spring, a step by step feed mechanism for the magazine actuated by the movement of said bar under the influence of its spring, means for moving the breech block away from the magazine by the movement of said bar under the influence of its spring, an exhaust valve, means for opening said exhaust valve when the piston reaches its forward limit of travel and for closing said exhaust valve when the piston reaches its rearward limit of travel.

15. The combination with a longitudinally movable switch operating bar, an actuating motor containing a switch bar operating part for moving said switch operating bar to switch closing position, supporting means holding said bar and said operating part in axial alignment, mechanism in said motor imparting endwise movement to said operating part comprising a plurality of cartridges each containing a charge which when burned deliver a volume of propulsive gases, means for automatically discharging a plurality of said cartridges in succession and for delivering the forces released thereby upon said switch bar operating part, to actuate the longitudinally movable switch operating bar when the same fails to stay in switch closing position, and means for creating determined periods of delay between the firing of the several cartridges.

16. A structure of the character described comprising a barrel, a movable magazine associated therewith adapted to receive a plurality of pressure generating shells, a breech block adapted to back up said shells as they are brought into alignment with said barrel, means for operating said breech block under pressure generated within the barrel, a firing pin carried by the breech block, an electric circuit of which said firing pin constitutes a part, a scavenging means for the barrel, and means for preventing closing of the electric circuit until after the scavenging means has been operated.

17. The combination with a barrel, a magazine rotatively mounted with respect thereto, a cylinder, a piston in said cylinder operable under pressure generated within said barrel, a member actuated by said piston, a spring resisting movement of said member in which power is stored by the movement of said member, means operable under the return movement of said member for turning said magazine, a dashpot comprising a piston and piston rod, means for connecting said piston actuated member to the piston rod of the dashpot during the initial return movement of said member and for disengaging the piston rod of the dashpot and said member near the completion of the return movement of said member, means for causing the piston rod of the dashpot to travel forwardly when released, an electric circuit for firing the shells carried by said magazine when brought into connection with said barrel, and means for interrupting said circuit, said means being closed when the piston of the dashpot completes its forward travel.

18. A structure as recited in claim 17 in combination with means actuated by the return movement of the first named piston actuated member for locking said magazine.

19. A structure of the character described comprising a barrel provided with a seating portion, a rotatably mounted magazine provided with a plurality of cylinders each containing unit charge shells of the pressure generating type, said cylinders being adapted to each successively engage the said seating portion, means to ignite the said unit charge shell and pressure operated means utilizing at least a portion of the pressure generated thereby to effectively seal the said engaged cylinder and the said seating portion in leak proof operative position.

ROSCOE A. COFFMAN.